United States Patent [19]
Henkel et al.

[11] 3,764,651

[45] Oct. 9, 1973

[54] PRODUCTION OF TITANIUM DIOXIDE CONCENTRATES FROM MATERIALS CONTAINING ILMENITE

[75] Inventors: Hanno Henkel, Krefeld; Hans Zirngibl, Duisburg; Jakob Rademachers, Krefeld, all of Germany

[73] Assignee: Bayer Aktiengesellschaft, Leverkusen, Germany

[22] Filed: Apr. 20, 1971

[21] Appl. No.: 135,767

[30] Foreign Application Priority Data
May 22, 1970 Germany.................. P 20 24 907.4

[52] U.S. Cl. ........................................ 423/86, 75/1
[51] Int. Cl. ........................................... C01g 23/04
[58] Field of Search ............... 75/1, 101; 423/86

[56] References Cited
UNITED STATES PATENTS

| | | | |
|---|---|---|---|
| 3,457,037 | 7/1969 | Aramendia et al. | 75/1 X |
| 3,597,189 | 8/1971 | Sinha et al. | 75/1 |
| 3,252,787 | 5/1966 | Shiah | 75/101 R X |
| 3,273,993 | 9/1966 | Melcher | 75/1 |
| 3,418,074 | 12/1968 | Sargeant | 75/1 X |
| 3,257,198 | 6/1966 | Volk et al. | 75/1 |

FOREIGN PATENTS OR APPLICATIONS

| | | | |
|---|---|---|---|
| 113,553 | 7/1941 | Australia | 75/1 |
| 1,041,021 | 10/1958 | Germany | 75/1 |

*Primary Examiner*—A. B. Curtis
*Attorney*—Burgess, Dinklage & Sprung

[57] ABSTRACT

In the production of a titanium dioxide concentrate from an ilmenite-containing material the ilmenite-containing material is pretreated at about 600° to 900°C. with its Fe(II) : Fe(III) ratio in the range of about 5 : 1 to 1 : 18. An oxidizing atmosphere may be used to bring such ratio within the desired range and further heating may be effected in an inert atmosphere. The ratio may be monitored by measuring the magnetic properties or the X-ray lattice constants during pretreatment and discontinuing such treatment when the magnetic properties or lattice constants reach predetermined values.

The pretreated material is than acid leached to dissolve away undesired materials and leave concentrated titanium dioxide.

12 Claims, No Drawings

PRODUCTION OF TITANIUM DIOXIDE CONCENTRATES FROM MATERIALS CONTAINING ILMENITE

This invention relates to a process for enriching titanium dioxide in naturally occurring materials, especially ilmenite, by treating the material containing titanium dioxide with acids, the titanium dioxide being recovered in solid form.

Over recent years, the so-called chloride process has been acquiring ever increasing significance in the production of $TiO_2$ pigments. In this process, titanium tetrachloride is reacted with oxygen at an elevated temperature to form the oxide and chlorine. A material rich in $TiO_2$ has to be used to produce the initial titanium tetrachloride. Accordingly, rutile is preferably used as starting material for the chloride process but this is not available in sufficient quantities. For this reason, numerous processes have been proposed for producing a synthetic rutile from other naturally occurring minerals containing $TiO_2$. Most of these processes comprise working up ilmenite ores because ilmenite ores do occur naturally in sufficient quantities. The ilmenite contains $TiO_2$ in quantities of from about 30 to 60% and iron, in particular, as an important secondary constituent. It also contains as highly undesirable accompanying elements the so-called coloring impurities (chromium, vanadium and manganese oxides) and alkaline earth metals. Whereas the iron is removed from the ilmenite ores primarily for economic reasons, it is particularly necessary to remove the alkaline earth metals because they have an extremely troublesome effect upon the chloridizing reaction.

Current processes for working up $TiO_2$-containing materials are essentially divided into two groups. In the first group, the mineral is completely dissolved and the dissolved constituents subsequently worked up into a $TiO_2$-containing concentrate. In the other group of processes, it is only the undesirable constituents of the $TiO_2$-containing materials which are dissolved, while the $TiO_2$ is left behind as a residue in as pure a form as possible. The second of these two groups of processes is preferably used in the production of the starting materials for the chloride process. The tetrachloride is generally produced by the fluidized-bed technique for which a relatively coarse-grained titanium dioxide has to be used as a starting material. Accordingly, the object of most of the proposed processes is to obtain a relatively coarse-grained material.

Processes are known in which the iron present in the $TiO_2$-containing materials is completely oxidized into $Fe_2O_3$ in a first stage. In a second stage, the trivalent iron is reduced to the metal with solid, liquid or gaseous reducing agents. The reduction conditions have to be selected in such a way that the material to be disintegrated does not melt and that the iron accumulates in a spongy, finely divided form.

Although the iron component is converted with considerable outlay into the metallic form, it is not possible to separate the iron in this form from the concentrate. In order to separate the iron, the material has to be leached in a further stage with dilute acids or with iron (III) chloride solutions (German DAS 1208497) or with ammonium carbonate solutions (German DAS 1218734). German DAS 1092210 relates to a process in which the $TiO_2$-containing material is initially pretreated under oxidizing conditions and then disintegrated with sulfuric acid at an elevated pressure in an autoclave under reducing conditions. However, the iron can only be separated if it is ground during disintegration. Accordingly, a granular material suitable for use in the chloridizing reaction cannot be obtained by this process.

U.S. Pat. No. 3,457,037 relates to a process in which ilmenite is initially reduced to a particle size of from about 75 to 300 microns, the rocky material being separated. The fine-grained material is then adjusted under oxidizing conditions to an Fe(III)/Fe(II) ratio of about 1:1 and then further treated under reducing conditions in order to convert the iron oxide present in the ilmenite into metallic iron. The material thus pretreated is then treated in two stages with dilute acids in a concentration of from 5 to 25%. In the first stage, the metallic iron is quickly removed at relatively low temperatures, while in a second stage the magnesium oxide present in the starting material is separated at considerably higher temperatures in conjunction with a prolonged leaching period. In a first stage, leaching is carried out with a relatively low acid:ore ratio at a temperature of from 20° to 60°C. In this second stage, leaching is carried out with a greater quantity of acid and at a temperature of from 70° to 100°C. Although a relatively coarse-grained product is obtained in this process, separation of the magnesium oxide often presents difficulties, in addition to which the process is relatively complicated.

It is accordingly an object of the invention to pretreat ilmenite-containing materials so that the titanium dioxide values thereof can be subsequently recovered easily and in high concentration.

These and other objects and advantages are realized in accordance with the present invention wherein, prior to leaching an ilmenite-containing material with acid to dissolve the non-$TiO_2$ constituents and leaves a residue of titanium dioxide concentrate, the ilmenite-containing materials are activated in a non-reducing atmosphere at temperatures of from about 600° to 900°C with an Fe(II):Fe(III) ratio kept at or adjusted to about 5:1 to 1:18.

Surprisingly, it has been found that ilmenite-containing materials can be activated by straightforward heat treatment in such a way that the iron, the magnesium and other troublesome impurities can be separated substantially quantitatively by leaching with dilute acids that are easy to regenerate, particularly azeotropic hydrochloric acid. The titanium dioxide concentrates obtained by the process according to the invention are granular products that are eminently suitable for use in the fluidized-bed chloridizing process, having a titanium dioxide content of at least about 92 to 96% of $TiO_2$ and particle sizes of from about 75 to about 350 microns, depending upon the starting material used.

The pre-treatment has to be adapted to some extent to the ilmenite. If an Fe(II):Fe(III) ratio of 5:1 to 1:18 is already present in the starting material, a simple heat treatment in an inert atmosphere at a temperature of from 600° to 900°C is all that is required. A pre-treatment period of from about 1 to 12 hours is sufficient. After activation, the material is leached in hydrochloric acid or sulfuric acid. Acids with concentrations of from about 10% to 37% are used. Leaching itself is carried out in static or moving beds in the usual apparatus suited to this purpose such as, for example, percolating tanks, vessels equipped with stirring mechanisms, agitation cascades or fluidized beds. Rotary drums are also suitable. In addition, leaching can be carried out in counter current, in transverse current or in parallel current.

In the case of ilmenites in which the required Fe (II): Fe (III) ratio has to be adjusted beforehand, oxidizing activation is initially carried out and this is followed by a non-oxidizing activation. However, the two activation stages can also be combined into a single stage in which case the material to be activated is tempered in a low-oxygen atmosphere. In the two-stage process, the material to be activated is initially adjusted to an Fe (II) : Fe (III) ratio of from 5:1 to 1:18, preferably from about 1:1 to 1:10 and, with particularly good results, to an Fe(II) : Fe(III) ratio of from about 1:1.5 to 1:4 at temperatures of from 600° to 900°C and preferably at temperatures of from about 600° to 800°C. Activation is preferably carried out in an oxygen-containing atmosphere, i.e. in air, in air enriched with oxygen or even at reduced oxygen partial pressures. However, it can also be tempered in the presence of oxygen donors, for example in the presence of nitrates. The presence of nitric oxides is also of particular advantage.

It can be assumed that, in the case of ilmenite consisting largely of iron-meta-titanate, some of the $FeTiO_3$ is decomposed into $Fe_2O_3$ and $TiO_2$ (rutile) by this initial oxidation stage. Photographs taken with an electron microscope during the initial oxidation stage showed that the rutile crystals ripen during tempering into regularly formed crystal needles heavily entangled with one another. This entanglement promotes cohesion of the origional grain so that the ore grains retain their size and shape during the subsequent leaching stage. As already mentioned, this is of particular importance so far as the production of fluidizable titanium dioxide concentrate is concerned. The first stage, which takes from about 10 minutes to 10 hours, is followed by a second tempering at temperatures of from 600° to 900°C in an inert atmosphere. This tempering is complete in about 1 to 12 hours and preferably in about 3 to 6 hours. The essential object of this stage is to ripen the pre-oxidized material.

After tempering, the material is leached in known manner after which the titanium dioxide concentrate is separated from the dissolved constituents. In the one-stage process, the stages of oxidizing activation and activation in a neutral atmosphere are combined with one another. This single-stage activation is preferably carried out at temperatures of from about 700° to 900°C in a low-oxygen atmosphere. It is preferred to operate with oxygen contents of from about 0.01 to 10% by volume of oxygen. Depending upon the properties of the ilmenite, the time required for this single-stage oxidation varies from about 1 to 12 hours. The time required for the particular ilmenite used can be established relatively easily by a preliminary test.

In all the aforementioned embodiments of the process according to the invention, it is advisable to saturate the reaction gases used with steam at temperatures about 40°C. The steam evidently has a favorable mineralizing influence and prevents the particles from caking together during activation.

Investigations with X-ray photographs in conjunction with the magnetic behavior of the samples support the assumption that $Fe_2O_3$ already present or formed by the initial oxidation stage is incorporated into residual iron meta-titanate in phases of the system $xFe_2O_3(1-x)$-$FeTiO_3$. This operation actually begins during the first stage of the process and is completed during the second stage.

Accordingly, the progress of the reaction can be readily followed by X-ray photography (determining the lattice constants and the molecular volume calculated therefrom ) and also by monitoring the magnetic properties whose dependence upon the composition of the corresponding phases is known per se. Starting from pure $FeTiO_3$, the magnetism rises sharply with increasing iron (III) content, passes through a ferromagnetic maximum at around 30 mole % of $Fe_2O_3$ and, at around 60% $Fe_2O_3$, has already fallen to the value of weakly magnetic $Fe_2O_3$. Thus, adjustment of the Fe (II) : Fe (III) ratios required can readily be monitored after calibration for a certain type of ilmenite.

Activation of the ilmenite in accordance with the invention can be carried out with particular advantage where the Fe (II) : Fe (III) is adjusted to substantially 1 : 2.

If the starting products are ilmenites of relatively high Fe (III) content, there is no need for initial oxidation, as already mentioned, and activation can be carried out by tempering in an inert atmosphere. Products of this kind show satisfactory leaching results, but unfortunately the concentrates formed can occasionally contain more or less large portions of fine materials.

One advantageous embodiment of the process according to the invention comprises the following measures :

ilmenite with $TiO_2$ content of from 40 to 50% and a grain size that is suitable for the fluidized-bed chloridizing process, is calcined at 780°C in a revolving tubular kiln. The smoke gas should have an oxygen content of about 1%. The progress of the reaction is followed by monitoring the magnetic properties at 30-minute intervals. This can be done very simply by means of a small beam balance and a permanent magnet. One of the pans of the balance is replaced by a cylindrical glass vessel into which the same quantity of product is always weighed. The force (weight) which has to be applied to lift the sample from the magnet arranged below it is a measure of the magnetic properties. After a residence time of about 6 hours, the Fe (II) : Fe (III) ratio of about 1 : 2 is reached and the product is cooled or chilled with water or air. Working up into $TiO_2$-concentrate is carried out in a multiple-stage fluidized-bed leaching process with 20% hydrochloric acid at temperatures which are as close as possible to, but do not reach, the boiling point. The leaching time can be significantly shortened by applying a positive pressure up to about 5 atmospheres, preferably a positive pressure of about half an atmosphere up to about 2 atmospheres and the increase in temperature which is thus rendered possible. The washed concentrate is dried and calcined at a temperature of 500° to 900°C, preferably at a temperature of 700°C, in order to obtain a residual moisture content of at most 0.2% of $H_2O$ for the chlorodizing reaction.

The hydrochloric acid iron chloride liquors which accumulate are decomposed into hydrochloric acid and iron oxide in accordance with the principle of spray roasting. The hydrochloric acid is recycled to the leaching stage. The iron oxide can be used in a manifold manner, particularly it can be processed by metallurgical methods.

The particular advantage of the process according to the invention is that the concentrate grains produced remain substantially unchanged in shape and size in relation to the starting products except for a few fine components.

The following Table shows that, where an ilmenite sand is used, the grain size is actually increased somewhat following a normal calcination period.

1. Secondary Deposit Ilmenite

One-stage Process 7 hours

| Grain size mm | ilmenite % | active ilmenite % | calcined concentrate % |
|---|---|---|---|
| 0.125–0.160 | — | 18.5 | 10.5 |
| 0.071–0.125 | 98.4 | 80.0 | 86.8 |
| 0.040–0.071 | 1.6 | 1.5 | 2.7 |

Another advantage of the process according to the invention is that it is also possible to process ilmenites with a high magnesium content, e.g. up to 7%. It was possible to produce from inter alia ilmenites with a magnesium content of 4.5% of MgO concentrates whose MgO content at 0.2% corresponds to that of more common rutile types. Eve with other types of ilmenite, more than 90% of the magnesium present was removed.

Another advantage is that the calcination stage of the process according to the invention can be conveniently carried out in conventional apparatus such as for example rotary kilns or fluidized bed reactors.

Percolation, agitation, fluidized-bed, leaching or cylinder leaching, for example, are available as forms, known in the art, of leaching in counter current, transverse current or parallel current. The process according to the invention is further illustrated by the following Examples.

EXAMPLE I

Six hundred g of primary deposit ilmenite (44.1% of $TiO_2$; 35.2% of FeO; 12.2% of $Fe_2O_3$; 4.5% MgO) with a grain size of less than 0.125 mm, were partially oxidized for 5 hours with moist air at 650°C in a quartz fluidization tube, and then tempered for 5 hours at 780°C in a moist nitrogen atmosphere. The reaction gases were saturated with steam at 85°C. Following disintegration with hydrofluoric acid, the iron (II) content of the reaction product was found by volumetric analysis to amount to 11.5%. The iron (III) content amounted to 22.8%. At 1 : 2, the Fe (II) : Fe (III) ratio corresponds to that in magnetite.

Three liters of azeotropic hydrochloric acid were added to 300 g of reaction product, followed by leaching for 7 hours at boiling temperature (approximately 110°C). A granular concentrate (with very few fine constituents) was obtained in a yield of 131.5 g or 94%. After calcination at 800°C, this concentrate had the following analytical composition, and its grain size was substantially unchanged in relation to the activated material :

|  | Ilmenite | Concentrate |
|---|---|---|
| $TiO_2$ | 44.1 | 94.2 |
| FeO | 35.2 | — |
| $Fe_2O_3$ | 12.2 | 1.2 |
| MgO | 4.5 | 0.2 |
| CaO | 0.3 | 0.3 |
| $SiO_2$ | 2.4 | 2.8 |
| $Al_2O_3$ | 0.5 | 0.07 |
| $Cr_2O_3$ | 0.03 | 0.01 |
| $V_2O_5$ | 0.3 | 0.08 |
| MnO | 0.35 | 0.01 |
| $H_2O$ | — | 0.2 |

| grain size mm | act. ilmenite % | concentrate % |
|---|---|---|
| 0.16–0.125 | 1.0 | 1.5 |
| 0.125–0.10 | 14.0 | 17.0 |
| 0.10–0.071 | 44.5 | 46.0 |
| 0.071–0.040 | 37.5 | 34.0 |
| less than 0.04 | 3.0 | 1.5 |

EXAMPLE II

Six hundred g of secondary deposit ilmenite (50.0% of $TiO_2$; 37.7% of FeO; 9.1% of $Fe_2O_3$; 0.5% MgO) were oxidized with moist air for 5 hours at 650°C, as in Example I, and then tempered for 5 hours at 780°C in an inert atmosphere.

During oxidation, the magnetic remanence of the sample increased from $Br/_s = 5$ G $g^{-1}cm^3$ to 21 G $g^{-1}cm^3$, and during tempering in an inert atmosphere reached a final value of 26 G $g^{-1}cm^3$. The Fe (II) — and Fe (III) — contents were measured by volumetric analysis at 15.8% of Fe (II) and 19.9% of Fe (III) and at 16.2% of Fe (II) and 19.5% of Fe (III) by X-ray photography through the linear dependence of the molar volume upon the composition $xFe_2O_3 (1-x)FeTiO_3$.

After leaching for 8 hours with 20% hydrochloric acid at boiling temperature, a concentrate was obtained with a coarse sandy product component comprising substantially 95%. After drying at 150°C, this sample had the following composition:

|  | Ilmenite | concentrate |
|---|---|---|
| $TiO_2$ | 50.0 | 94 |
| $Fe_2O_3$ | 9.1 | 1 |
| FeO | 37.7 | — |
| MgO | 0.5 | 0.06 |
| CaO | 0.4 | 0.02 |
| $SiO_2$ | 0.67 | 0.7 |
| $Al_2O_3$ | 0.86 | 0.23 |
| $Cr_2O_3$ | 0.07 | 0.03 |
| $V_2O_5$ | 0.33 | 0.09 |
| MnO | 0.8 | 0.02 |
| $H_2O$ | — | 2 |
| $ZrO_2$ | 0.5–1 | 1 |

Following removal of the last traces of $H_2O$ by calcination at 1000°C, the analytical $TiO_2$ content amounted to 96.6%. The surface, as measured by the BET method, increased from 0.2 $m^2/g$ (ilmenite) to 8 $m^2/g$ (concentrate dried at 150°C). A concentrate dehydrated at 650°C with a residual moisture content of 0.2% of $H_2O$ is particularly suitable for industrial chloridi ing with a grain size, slightly greater than that of the starting product, of 0.071 to 0.16 mm and a surface of 4$m^2/g$.

EXAMPLE III

Six hundred g of secondary deposit ilmenite with the same composition as in Example II were treated for 2 hours at 780°C in a fluidized-bed in the initial oxidation stage with a reaction gas which had been mixed beforehand from 3 parts by volume of oxygen and 97 parts of nitrogen and which had then been saturated with steam at 58°C. Tempering was continued for another 4 hours at 780°C without any addition of oxygen. The Fe (II) : Fe (III) ratio in the end product amounted to 1:3. 3 liters of azeotropic hydrochloric acid were added to 300 g of the end product, followed by leaching for 6 hours at boiling temperature in a flast equipped with a stirring mechanism. 140 g of granular product dried at 150°C with a $TiO_2$ content of 92.2% were obtained.

The fine constituent amounted to 0.7%, based on the concentrate as a whole.

EXAMPLE IV

One hundred fifty kg of secondary deposit ilmenite with the same composition as in Example II and with a grain size of from 0.071 to 0.125 mm were calcined at 780°C in a rotary flame kiln with the combustion gases from a combustion chamber operated with natural gas and air. The gas throughputs amounted to 5 m³ of natural gas and 45.5 m³ of air. The combustion gas had an oxygen content of from 0.6 to 1% of $O_2$ The progress of the reaction was followed by monitoring the magnetic properties at 30-minute intervals. The number of weights which had to be placed on one dish of a beam balance to lift 5 g of the sample at the other end of the balance from a fixedly installed permanent magnet, was a measure of the magnetic properties. The change in the magnetic characteristic as the reaction progresses is clearly apparent from the figures set out in the following Table :

| Sample after $x$ hrs. | characteristic in g |
|---|---|
| 0.5 | 8.7 |
| 1.0 | 10.3 |
| 1.5 | 12.2 |
| 2.0 | 14.7 |
| 2.5 | 16.0 |
| 3.0 | 18.5 |
| 3.5 | 21.2 |
| 4.0 | 23.2 |
| 4.5 | 23.0 |
| 5.0 | 22.3 |
| 5.5 | 20.7 |
| 6.0 | 18.5 |
| After discharge of the sample | 17.0 |

Adjustment of the Fe (II) : Fe (III) ratio of around 1 : 2 was completed after this period, the product was discharged and chilled with water. In order to test the leaching activity, 300 g of the end product were leached at around 110°C with 3 liters of azeotropic hydrochloric acid in a flask equipped with stirring mechanism. After leaching for only 2½ hours the concentrate had a $TiO_2$ content of 90%, a granular concentrate with $TiO_2$ content of 95% and an $Fe_2O_3$ content of 1% being discharged after 7 hours. Another 14 kg of this product were leached with 8 portions each of 5.9 kg of azeotropic hydrochloric acid in a fluidized-bed at 115°C/0.5 atmospheres. The leaching time amounted to 8 times 2 hours, while the excess of azeotropic hydrochloric acid amounted to only 13% in relation to the calculated quantity. 6.8 kg of granular end product dried at 150°C with a $TiO_2$ content of 93.2% were obtained (corresponding to a yield of 93%). The $TiO_2$ content rose to 95% after most of the residual moisture had been removed by calcination for 2 hours at 700°C.

EXAMPLE V

Six hundred g of primary deposit ilmenite with a relatively low $TiO_2$ content of 34.3% (grain size 0.071 to 0.160 mm) were calcined for 3 hours at 780°C in a fluidization tube.

The reaction gas was mixed from 99 parts of nitrogen and 1 part of oxygen and saturated with steam at 85°C. This was followed by tempering for 2 hours in a moist nitrogen atmosphere. The Fe (II) : Fe (III) ratio in the activated product amounted to 1 : 4. After 300 g of the end product had been leached for 7 hours with 3 liters of azeotropic hydrochloric acid, 105 g of a coarse-grained concentrate with a $TiO_2$ content of 90.7% were obtained. After calcination for 2 hours at 800°C, the following analytical composition was obtained:

| $TiO_2$ | 92.2% | $SiO_2$ | 3.1% | $Cr_2O_3$ | 0.03 |
|---|---|---|---|---|---|
| $Fe_2O_3$ | 2.2% | $Al_2O_3$ | 1.3% | MnO | 0.006 |
| MgO | 0.08% | $H_2O$ | 0.2% | $V_2O_5$ | 0.12 |

EXAMPLE VI

Two hundred g of primary deposit ilmenite with the same composition as in Example I were calcined for 3 hours at 730°C in a $CO_2$ atmosphere in a revolving quartz tube. The reaction gas was saturated with steam at 85°C. The magnetism of the sample increased during calcination in an inert atmosphere. 10 g of the end product were leached with 100 ml of 20 % sulfuric acid for 13 hours at boiling temperature in a flask equipped with stirring mechanism into which iron wire was introduced. After calcination at 800°C, the relatively finely divided concentrate contained 94.5% of $TiO_2$ and 3.3% of $Fe_2O_3$.

It will be appreciated that the instant specification and examples are set forth by way of illustration and not limitation and that various modifications and changes may be made without departing from the spirit and scope of the present invention.

What is claimed is:

1. In the production of a titanium dioxide concentrate from an ilmenite-containing material comprising leaching ilmenite-containing material with acid at elevated temperature to separate soluble constituents from the undissolved titanium dioxide, the improvement which comprises tempering said ilmenite-containing material immediately prior to said leaching in an inert or oxidizing atmosphere containing up to but not more than about 10% by volume of oxygen at a temperature of about 600° to 900°C. for about 12 to 1 hours, said material subsequent to said tempering having its Fe(II):Fe(III) ratio in the range of about 5 : 1 to 1 : 18, said leaching thereby producing a concentrate containing at least about 90% $TiO_2$.

2. Process according to claim 1, wherein the Fe(II) : Fe(III) ratio is in the range of about 1 : 1 to 1 : 10.

3. Process according to claim 1, wherein the Fe(II) : Fe(III) ratio is in the range of about 1 : 1.5 to 1 : 4.

4. Processs according to claim 1, wherein the Fe(II) : Fe(III) ratio is brought within the desired range from an initial value outside said range by tempering in an atmosphere containing about 0.1% to 10% by volume of oxygen.

5. Process according to claim 1, wherein said tempering is effected in an atmosphere saturated with steam at a temperature above 40°C.

6. Process according to claim 1, wherein leaching is effected with hydrochloric acid of about 10 to 37% concentration, at a positive pressure up to about 5 atmospheres and at a temperature ranging from about 40°C. to the boiling point of hydrochloric acid.

7. Process according to claim 1, wherein the ilmenite-containing material has a grain size of about 75 to 350 microns and a magnesium content up to about 7 %.

8. Process according to claim 1, wherein the Fe(II) : Fe(III) ratio is brought within the desired range from an initial value outside said range by tempering in an oxidizing atmosphere at a temperature of about 600° to 900°C.

9. Process according to claim 8, wherein the pretreatment includes tempering is effected in an inert atmosphere.

10. Process according to claim 8, wherein the Fe(II) : Fe(III) ratio is monitored during the course of the tempering by measuring the lattice constants of the product, the tempering being terminated when the lattice constants reach predetermined value.

11. Process according to claim 8, wherein the Fe(II) : Fe(III) ratio is monitored during the course of the tempering by measuring the magnetic properties of the product, as determined by X-ray photography, the tempering being terminated when the magnetic properties reach a predetermined values.

12. Process according to claim 9, wherein the ilmenite-containing material has a grain size of about 75 to 160 microns and a magnesium content up to about 7 %, wherein the Fe(II) : Fe(III) ratio is initially outside the range of 1:1.5 to 1:4 and is monitored during tempering in an oxidizing atmosphere containing steam and about 0.1 to 10% by volume of oxygen at a temperature of about 600° to 800°C, the tempering being discontinued when the monitor indicates a ratio within said range, the product being chilled with water or air after the final tempering, and being leached with azeotropic hydrochloric acid at a positive pressure of about 0.5 to 2 atmospheres and at a temperature ranging from about 40°C to the boiling point of the hydrochloric acid.

* * * * *